(12) United States Patent
Yoshida et al.

(10) Patent No.: US 8,355,439 B2
(45) Date of Patent: Jan. 15, 2013

(54) TRANSCODER AND IMAGING APPARATUS FOR CONVERTING AN ENCODING SYSTEM OF VIDEO SIGNAL

(75) Inventors: Daisuke Yoshida, Yokohama (JP); Hironori Komi, Tokyo (JP); Yusuke Yatabe, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 12/839,540

(22) Filed: Jul. 20, 2010

(65) Prior Publication Data
US 2010/0283869 A1   Nov. 11, 2010

Related U.S. Application Data

(63) Continuation of application No. 10/768,757, filed on Jan. 30, 2004, now abandoned.

(30) Foreign Application Priority Data

Aug. 12, 2003  (JP) ................................ 2003-207246

(51) Int. Cl.
*H04N 7/12* (2006.01)
*H04N 11/02* (2006.01)
*H04N 11/04* (2006.01)

(52) U.S. Cl. .......... 375/240.12; 375/240.01; 375/240.29

(58) Field of Classification Search ............. 375/240.01, 375/240.29, 240.12
See application file for complete search history.

(56) References Cited

U.S. PATENT DOCUMENTS

| 7,173,947 B1* | 2/2007 | Ramakrishnan et al. ...... 370/537 |
| 2002/0106024 A1* | 8/2002 | Sato et al. ................ 375/240.12 |
| 2002/0181588 A1* | 12/2002 | Okada ..................... 375/240.12 |
| 2002/0194589 A1 | 12/2002 | Cristofalo et al. |
| 2003/0001964 A1* | 1/2003 | Masukura et al. ............ 348/441 |
| 2003/0215018 A1 | 11/2003 | Macinnis et al. |
| 2004/0073536 A1 | 4/2004 | Smith-Semedo et al. |
| 2004/0218671 A1* | 11/2004 | Haraguchi et al. ....... 375/240.12 |

FOREIGN PATENT DOCUMENTS

| JP | 2000-244872 A | 9/2000 |
| JP | 2000-244929 A | 9/2000 |
| JP | 2001-169295 A | 6/2001 |
| JP | 2001-285823 A | 10/2001 |
| JP | 2002-152755 A | 5/2002 |

OTHER PUBLICATIONS

USPTO Office Action dated Jun. 18, 2007 for U.S. Appl. No. 10/768,757.

(Continued)

*Primary Examiner* — David Czekaj
*Assistant Examiner* — Chikaodili E Anyikire
(74) *Attorney, Agent, or Firm* — Kilpatrick Townsend & Stockton LLP

(57) ABSTRACT

The time required to transcode an encoded image signal to an image signal encoded by a different encoding method is reduced.
Disclosed herein is a transcoder comprising: picture selector 4 which extracts specific types of pictures (I- and P-pictures) from a first image signal (MPEG2 stream) and generates a subset of the first image signal; a first decoder 5 which decodes the subset image signal; and a first encoder 7 which encodes the decoded image signal to a second image signal (MPEG4 stream). The picture selector 4 uses the extracted pictures to generate the subset image signal with a reduced effective length.

10 Claims, 6 Drawing Sheets

OTHER PUBLICATIONS

USPTO Final Office Action dated Nov. 7, 2007 for U.S. Appl. No. 10/768,757.
USPTO Office Action dated Apr. 9, 2008 for U.S. Appl. No. 10/768,757.
USPTO Final Office Action dated Aug. 14, 2008 for U.S. Appl. No. 10/768,757.
USPTO Office Action dated Jun. 10, 2009 for U.S. Appl. No. 10/768,757.
USPTO Final Office Action dated Jan. 20, 2010 for U.S. Appl. No. 10/768,757.

* cited by examiner

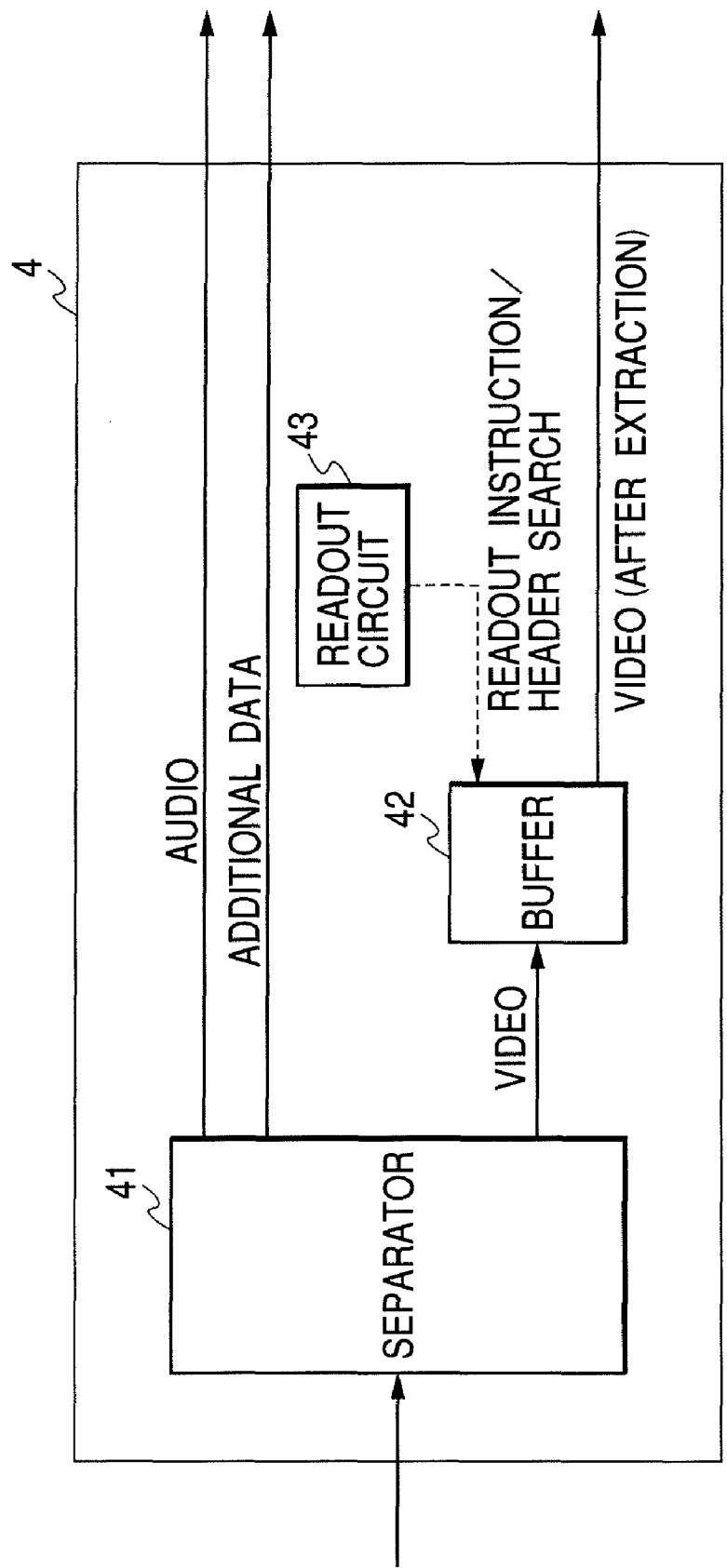

FIG. 3(a)
FIG. 3(b)
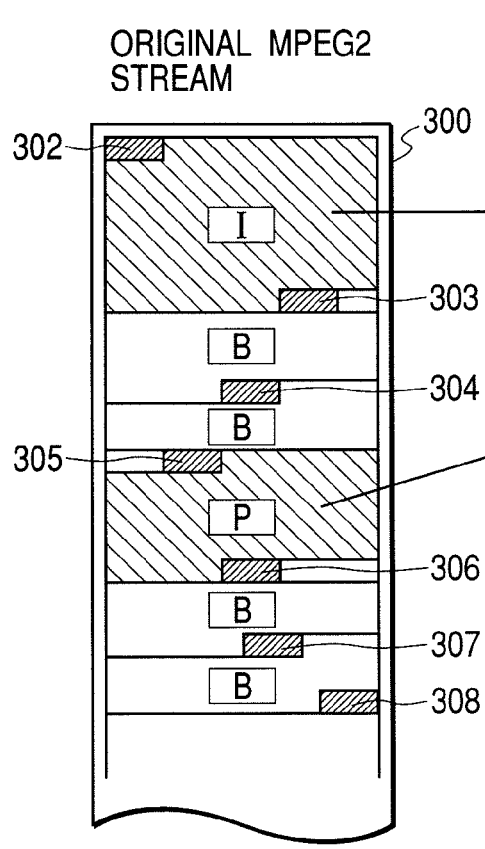
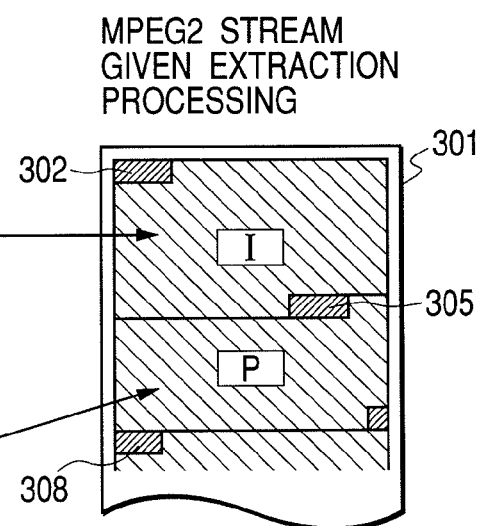

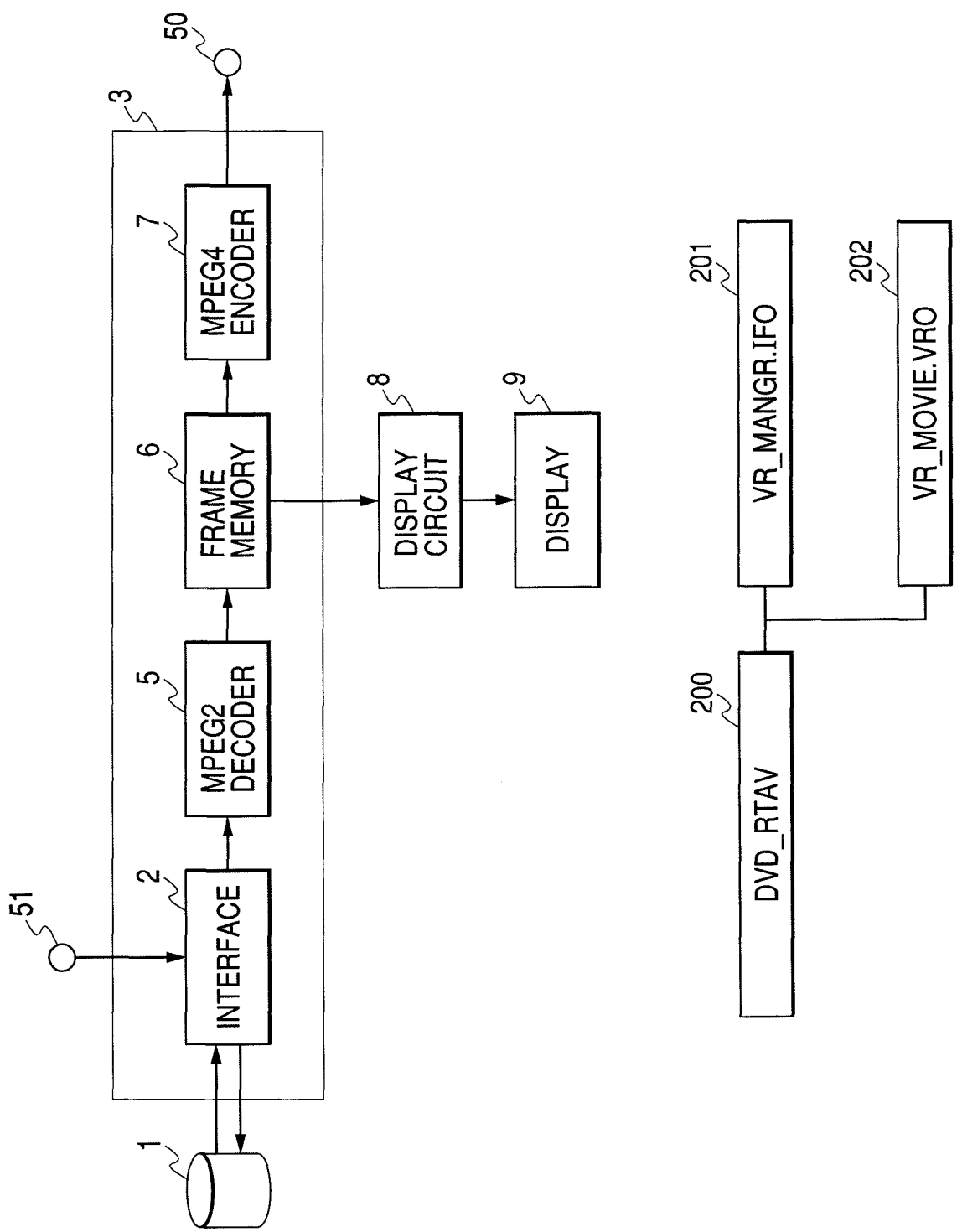

TRANSCODER AND IMAGING APPARATUS FOR CONVERTING AN ENCODING SYSTEM OF VIDEO SIGNAL

CROSS-REFERENCE TO RELATED APPLICATION

This application is a continuation application of U.S. patent application Ser. No. 10/768,757, filed on Jan. 30, 2004, which claims priority from Japanese Patent Application 2003-207246, filed on Aug. 12, 2003, the content of both of which are hereby incorporated in their entirety by reference into this application for all purposes.

BACKGROUND OF THE INVENTION

1. Field of the Invention

The present invention relates to a transcoder for converting the coding format of an image signal and to an imaging apparatus and signal processor using this transcoder.

2. Description of the Related Art

Prior Art

To record moving image signals on recording media or transmitting them over the Internet, radio and other communication media, techniques for compressing and encoding moving image signals by MPEG and other compressing algorithms have recently been used in various fields. For example, MPEG2-Video (ISO/IEC13818-2) is used for recording to and playing back from DVDs. In addition, MPEG4-Video (ISO/IEC14496-2) is used in radio communication and Internet applications. Including them, a variety of encoding methods have been proposed. With the diversification of encoding methods, however, it has become necessary to transcode data among these formats and improve the transcoding capability. In particular, if the time required for the transcoding process is reduced, the user side is given raised convenience:

A technique disclosed in Japanese Patent Laid-open No. 2002-152755 concerns improvement in the transcoding speed. This technique "reduces the temporal resolution of an input video stream by thinning out bidirectional predictive frames and reduces the spatial resolution by reducing the picture size of the temporal resolution-lowered video stream without inversely transforming transform coefficients" aimed at "shortening the transcoding time required to convert the video data to a different kind of video data by entirely eliminating the necessity of inverse transformation of coded transform coefficients in the frequency domain".

BRIEF SUMMARY OF THE INVENTION

According to the technique described in Japanese Patent Laid-open No. 2002-152755, the transcoding time can be reduced by eliminating the decoding process (i.e., inverse transformation of transform coefficients). However, in such a transcoder as to be configured to include a decoder for decoding an MPEG stream for display as an image signal, combined with an encoder for encoding/compressing the input image signal into an MPEG stream, eliminating the inverse transformation of transform coefficients does not substantially reduce the time required for transcoding if transcoding is made at a rate of one picture per frame period.

It is an object of the present invention to solve the above-mentioned problem and provide improved usability to the user by reducing the time required for transcoding.

To solve the above-mentioned problem, according to an aspect of the present invention, there is provided a transcoder which inputs a first image signal encoded by a first compressing and encoding method and transcodes the first image signal to a second image signal encoded by a second compressing and encoding method. The transcoder comprises: a picture selector which generates a subset image signal of the first image signal by extracting pictures of one or more specific types in frames or fields from the first image signal; a first decoder which decodes the subset image signal generated by the picture selector; and a first encoder which encodes the decoded image signal by a second compressing and encoding method. The picture selector uses the extracted pictures to generate the subset image signal with a shorter effective length.

According to another aspect of the present invention, there is provided a transcoder which reads out a first image signal encoded by a first compressing and encoding method from a re-coding medium and transcodes the first image signal to a second image signal encoded by a second compressing and encoding method. The transcoder comprises: an interface section which generates a subset image signal of the first image signal by extracting pictures of one or more specific types in frames or fields from the first image signal; a first decoder which decodes the subset image signal generated by the interface section; and a first encoder which encodes the decoded image signal by a second compressing and encoding method. The interface section uses the extracted pictures to generate the subset image signal with a reduced effective length.

BRIEF DESCRIPTION OF THE DRAWINGS

These and other objects, features and advantages of the present invention will become more readily apparent from the following detailed description when taken in conjunction with the accompanying drawing wherein:

FIG. 2 shows a configuration of the picture selector in FIG. 1;

FIG. 3 is a imaginary diagram showing an example of a picture selecting scheme in FIG. 1;

FIG. 5 is a block diagram of another transcoder according to a second embodiment of the present invention;

FIG. 6 shows an example of a file configuration on a recording medium 1 in FIG. 5.

DETAILED DESCRIPTION OF THE INVENTION

Figure 1:
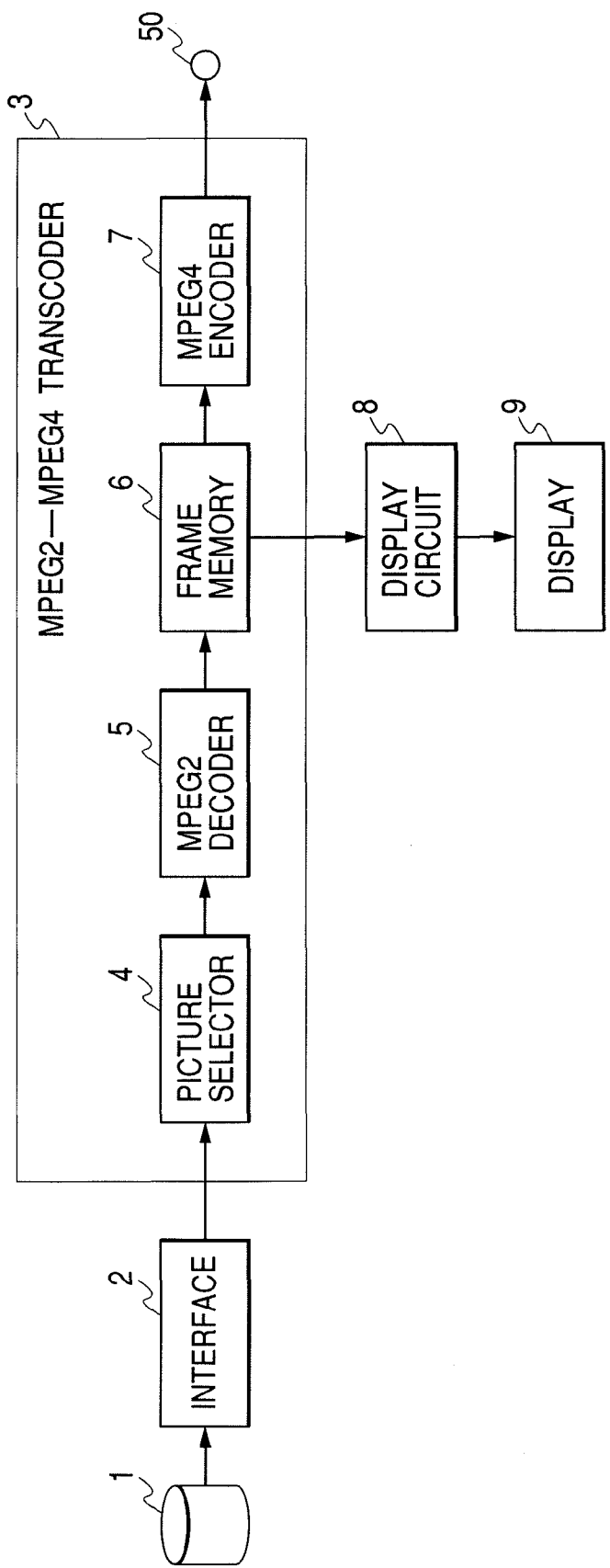
FIG. 1 is a block diagram of a transcoder, according to a first embodiment of the present invention.

FIG. 1 shows a block diagram of a transcoder according to a first embodiment of the present invention. In FIG. 1, a stream, read out from a recording medium 1, is transcoded by a transcoder 3 and output from an output terminal 50. The transcoder 3 comprises a picture selector 4, an MPEG2 decoder 5, a frame memory 6 and an MPEG4 encoder 7. In addition, the signal accumulated in the frame memory 6 is displayed by a display 9 via a display circuit 8.

In the transcoder shown in FIG. 1, a MP@ML (main profile at main level) MPEG2 stream (hereafter denoted simply as an MPEG2/MP@ML stream) is transcoded to a SP (simple profile) MPEG4 stream (hereafter denoted simply as an MPEG4/SP stream) and output.

Specifically, it is assumed in the following operational description that a 30 frames/sec MPEG2/MP@ML stream is transcoded to a 10 frames/sec MPEG4/SP stream. Firstly, an MPEG2 stream stored on the recording medium 1 such as a DVD is read out by an interface 2 and supplied to the picture selector 4. The picture selector 4 searches the incoming MPEG2 stream for picture headers and extracts pictures of a specific kind in frames or fields so as to generate an MPEG2 stream whose picture population is reduced to a third. How the picture selector 4 is configured will be described later in detail. The MPEG2 stream, after given extraction processing, is output and supplied from the picture selector 4 to the MPEG2 decoder 5. The MPEG2 decoder 5 converts the input MPEG stream to a digital video signal containing pixel value data by decoding the input MPEG stream. Pixel value data is accumulated in the frame memory and, according to a display sync signal, read out to the display section for output on the display 9. Concurrently, the digital video signal is supplied from the frame memory 6 to the MPEG4 encoder 7 which in turn encodes the signal to an MPEG4 stream and outputs it to the output terminal 51.

FIG. 2 shows a configuration of the picture selector 4 in FIG. 1. The picture selector 4 has a separator 41, a buffer memory 42 and a buffer memory readout circuit 43. The MPEG2 stream has audio, video and additional data and others multiplexed thereinto. The separator 41 generates ESs (Elementary Streams) by separating the MPEG2 stream according to data type and performing system decode. A video ES is accumulated in the buffer memory 42. Provided with a picture head search function, the buffer memory readout circuit 43 sequentially searches the buffer memory 42 to detect each picture head and determines the type of the associated picture. If a determined picture type is the type of pictures to be extracted, data is read out until just before the next picture head. Extraction of pictures of specific picture types is realized through this procedure.

FIG. 3 is an imaginary diagram showing an example of how pictures are selected in the present embodiment. The MPEG2 stream comprises three types of pictures: I-pictures coded within frames, P-pictures predicted and coded with reference to past frames and B-pictures predicted and coded with reference to both past and future frames. FIG. 3A shows a video ES 300 stored in the buffer memory 32. A video ES 301 shown in FIG. 3B is a result of the video ES 300 read out from the buffer memory 42 and given picture selection by the readout circuit 43. Of the input video ES, only I-pictures and P pictures are extracted whereas B-pictures are removed: If the video ES 300 has a picture sequence <IBBPBBPBBPBBPBBIBB . . . >, the video ES 301 has a'.picture sequence <IPPPPPI . . . >.

Firstly, the buffer memory readout circuit 43 detects a picture header 302 in the video ES 300, judges that the picture is a I-picture which is to be extracted, and starts reading out data. Then, the readout circuit 43 detects the next picture header 303, judges that the picture is a B-picture which is to be removed, and stops reading out data just before the picture header 303. The readout circuit 43 resumes header search and detects picture headers 304 and 305. The readout circuit 43 detects that the picture following the picture header 305 is a P-picture which is to be extracted, and starts reading out data. By repeating this procedure, only I-pictures and P-pictures are extracted from the video ES 300 to generate the video ES 301.

As apparent in FIG. 3, the video ES 301 is configured in such a manner that I-picture data is immediately followed by the subsequently extracted P-picture data. Therefore, as a subset of the video ES signal 300, the video ES 301 is shorter than the video ES 300. Note that although not shown in the figure, the subset video signal may also be arranged so as to contain a space for each non-extracted B-picture. This does not change the effective length since the spaces can be skipped in the subsequent signal processing (decoding).

The MPEG2 decoder decodes the supplied MPEG2 stream and stores it in the frame memory 6 so that the decoded video signal may be displayed. The stored video signal is retained until displayed. In order to prevent the frame memory from overflowing or underflowing, the decoding speed must be equal to the display speed. Accordingly, increasing the total number of pictures increases the number of pictures to be displayed. The time required for recording becomes longer in proportion to the total number of pictures.

Assume that the video ES 300 is to be transcoded in a conventional method. In this case, after the non-thinned out picture sequence <IBBPBBPBBPBBPBBPBBI . . . > is decoded, B-pictures are removed to supply a stream <IPPPPI . . . > to the MPEG4 encoder 7 for encoding. Accordingly, the time required for transcoding equals the time required to decode and display the non-thinned out video ES 300 which contains all pictures.

According to the present invention, the above-mentioned transcoding is performed after a video ES 301, a subset of the video signal ES 300, is generated by removing B-pictures from the video ES 300. The MPEG decoder 5 decodes the video ES 301, that is, only the pictures <IPPPPI . . . > and directly supplies the decoded video signal to the MPEG4 encoder. The total number of pictures contained in the video ES 301 is reduced to a third by the picture extraction circuit 4 as compared with the total number of pictures contained in the video ES 300. Thus, since the time required for transcoding is reduced to a third as compared with that required to decode and display the video ES 300, the transcoding time can be reduced remarkably. In this case, pictures are displayed at the triple speed via the display unit 8 as compared with the display speed taken when the stream is played back without removing pictures.

Figure 4A:
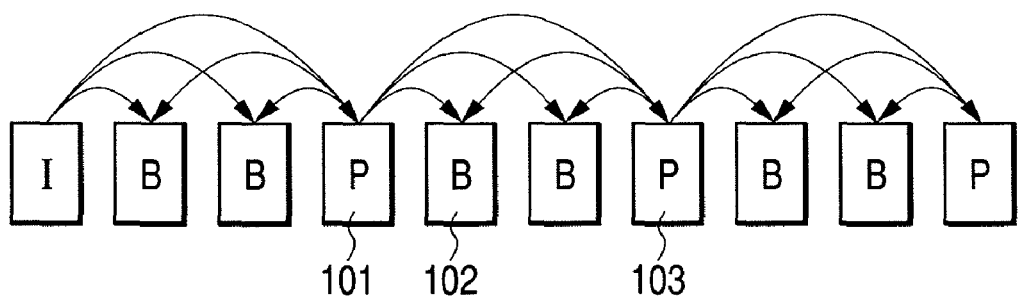
FIG. 4 is a diagram showing a preferable picture extracting condition in FIG. 1.
Figure 4B:
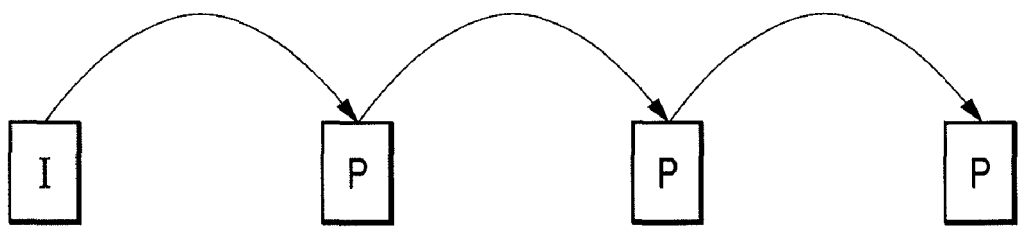
Figure 4C:
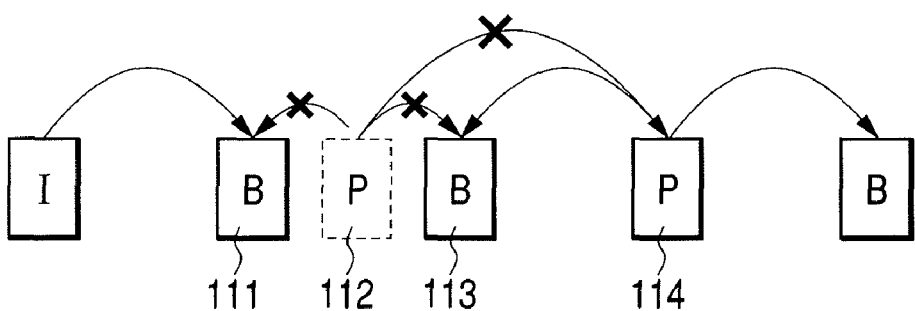

FIGS. 4A to 4C show a preferable picture extracting condition which can be employed in the picture selector 4. In the MPEG prediction and coding method, reference is required between pictures for inter-picture motion compensation. For a pre-extraction stream as shown in FIG. 4A, for example, a B-picture 102, is predicted and coded with reference to a P-picture 101 and a P-picture 103. FIGS. 4B and 4C are examples of streams derived as results of extraction by the picture selector 4. In FIG. 4B, the I-pictures and P-pictures are extracted whereas the B-pictures are removed. This is one of the preferable extracting schemes since each extracted P-picture can refer to other extracted pictures. In the case of the extraction scheme shown in FIG. 4C, however, extracted B-pictures 111 and 113 and P-picture 114 cannot refer to a removed P-picture 112 which should be referred to. This makes it impossible to decode these extracted pictures. That is, the picture extraction scheme of the picture selector 4 must be designed so that each extracted picture can refer to another extracted picture.

As other preferable extraction schemes, extracting only I-pictures from a video stream comprising I-, P- and B-pictures, extracting I-pictures from a video stream comprising I- and P-pictures and extracting specific I-pictures from a video stream comprising I-pictures are also applicable. Further, such a configuration is possible as to allow the user to specify what pictures are to be extracted.

The aforementioned embodiment is also characterized by the processing speed of the picture selector 4. As described earlier, when the stream (video ES) 300 in FIG. 3A is thinned to the stream 301 in FIG. 3B, the total number of pictures contained in the stream reduces to a third. Because of this reduced number of pictures, the time required for the subsequent decoding can be shortened. For the picture selector 4 to perform extraction and removal without delay, however, data must be supplied to the picture selector 4 at a higher rate than the decoding rate. In the above-mentioned case where B-pictures are removed from a stream having a picture sequence <IBBPBBPBBPBBPBBI . . . > to generate a stream <IPPPPI . . . >, the stream must be supplied to the picture selector 4 at a bit rate three times as fast as the decoding bit rate if the I-, P- and B-pictures has the same amount of code per picture. Otherwise it is not possible for the picture selector 4 to perform extraction and removal without delay. Generally, however, since I-pictures have the largest amount of code, followed by P-pictures and then B-pictures, the stream supply bit rate must not be three times as fast as the decoding bit rate. Since it is specified that an MPEG2/MP@ML may have a bit rate of up to 15 Mbits/sec, it is sufficient to supply the stream to the picture selector 4 at 45 Mbits/sec, three times as fast as the-maximum bit rate.

As an example, assume that the recording medium 1 is a DVD-ROM. In this case, since data can be input to the picture selector 4 via the interface section 2 at a bit rate of up to 160 Mbits/sec, it is possible to supply MPEG2 stream data to the picture selector 4 at a sufficiently high bit rate. In addition, since the readout circuit 43 can perform header search processing at a maximum bit rate of about 1 Gbits/sec if it operates in 16 bits at 81 MHz, the readout circuit 43 can easily afford to perform header search processing on the data which is input at the above-mentioned bit rate. The same header search processing can also be implemented by software. For example, if the CPU operates at 200 MHz and 30 cycles are spent to process each word, header search processing can be executed at a maximum bit rate of 106 Mbits/sec, which is sufficiently high for the input bit rate.

Then, FIG. 5 shows a block diagram of another transcoder according to a second embodiment of the present invention. This embodiment differs from the first embodiment (FIG. 1) in that to extract and remove pictures from a stream which is read out from a recording medium 1, an interface 2 is used instead of the picture selector 4 of the first embodiment. On the recording medium 1, a stream entered from an input terminal 51 is stored via the interface 2.

If the recording medium 1 is a DVD or the like, a management information file is stored together with an MPEG2 stream. A management information file is created by the interface 2 when a stream file, entered from the input terminal 51, is to be stored on the recording medium 1. In the management information file, the picture type, storage location and size of each picture are recorded. By referring to this management information file, the interface 2 identifies the locations of the respective pictures to be extracted. Accordingly the interface 2 extracts these pictures from the stream and supplies them to an MPEG2 decoder 5 where transcoding is done by the same process as in the first embodiment.

FIG. 6 shows the file configuration prescribed in the DVD Video Recording specification. On the recording medium, the DVD RTAV directory 200 exists with the hierarchically lower VRMANGR.IFO file 201 and VRMOVIE.VRO file 202. VR MOVIE.VRO 201 stores MPEG2 stream data which is divided into small units called VOBUs (Video. Object Units). Each VOBU has one I-picture. VRMANGR.IFO 202 is a management information file where the location and size of the I-picture in each VOBU are recorded in the form of a table for use in fast forward, backward and other special play modes. Therefore, when I-pictures are to be extracted, the interface block 2 can refer to VR MANGR.IFO 201 to recognize the location and size of each I-picture. Each I picture can be extracted by reading out as large data from the recognized location as the recognized picture size.

According to this embodiment, since the video signal is downscaled to a subset in the stage of extraction/readout from the recording medium 1, the time required for the subsequent processing can be shortened.

Although it is assumed in the above-mentioned example that the recoding medium conforms to the DVD Video Recording specifications, this embodiment is also similarly applicable to other recording media if management information indicating the type and location of each picture is recorded thereon.

Note that if the recording medium 1 is a removal recording medium and a stream is written onto the medium by using another apparatus, there is a possibility that the management file may not exist thereon. By taking into such a case into consideration, this embodiment may also be provided with such a function as to analyze the stored stream read out by the interface block 2 and create a management information file for storage on the recording medium.

Figure 7:
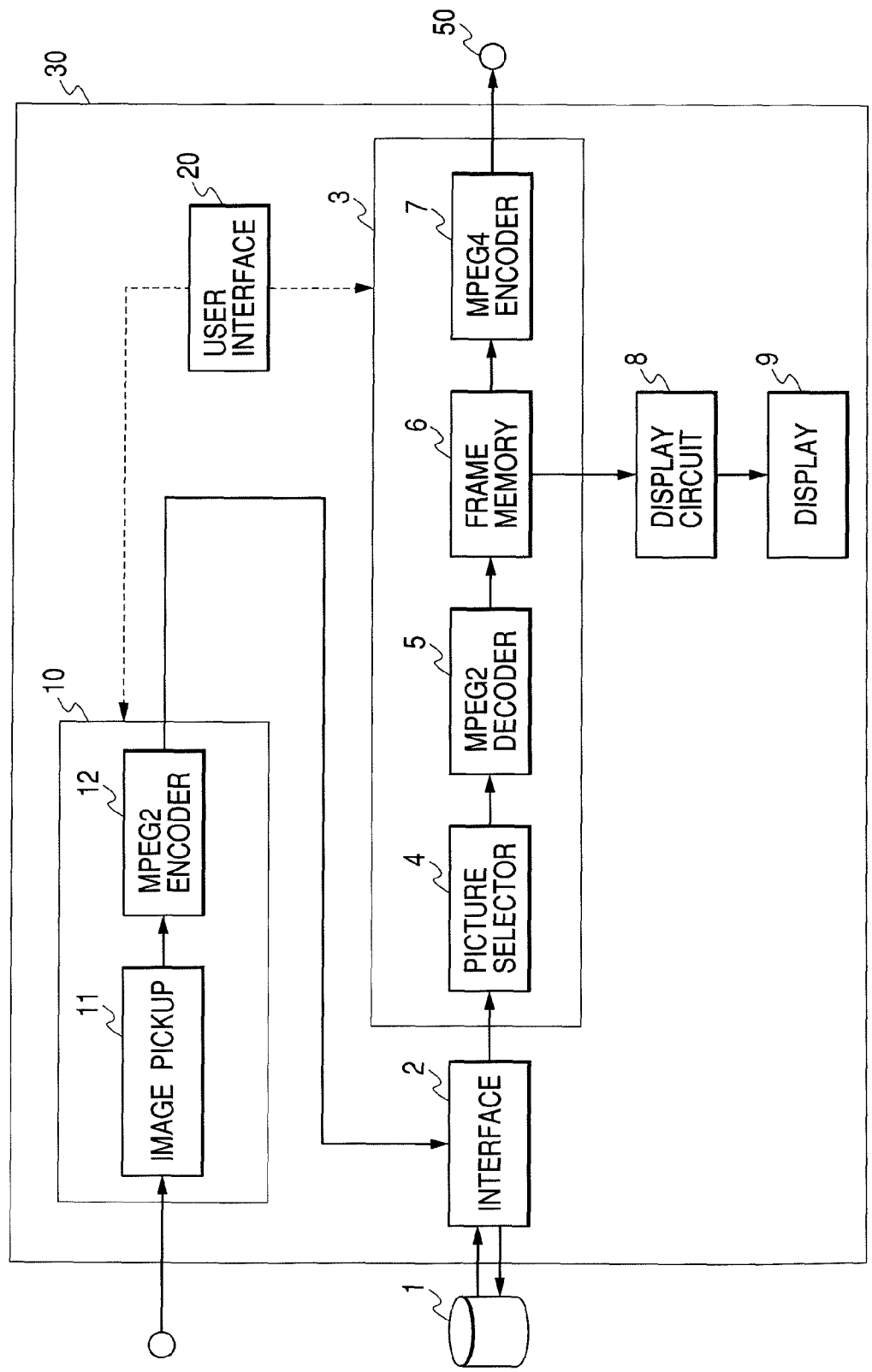
FIG. 7 is a block diagram of an imaging apparatus according to a third embodiment of the present invention.

FIG. 7 is a block diagram of an imaging apparatus according to a third embodiment of the present invention. This embodiment is an imaging apparatus where the transcoder shown in FIG. 1 as the first embodiment is used. Besides the configuration of the first embodiment, this imaging apparatus 30 comprises a camera unit 10 and a user interface 20. The camera unit 10 is composed of an image pickup block 11 and an MPEG2 encoder 12.

If it is demanded by the user to record MPEG2 moving images on the recording medium 1, the user interface 20 issues a recording instruction to start the image pickup block 11 in the camera unit 10 generating a digital video signal. The MPEG2 encoder 12 generates an MPEG2 stream by encoding the digital video signal. Then, the MPEG2 stream is recorded on the recording medium 1 via the interface 2.

In addition, if it is demanded to transcode the MPEG2 stream recorded on the recording medium 1 to an MPEG4 stream, the user interface 20 issues a transcode instruction. The same transcoding process as in the first embodiment is started by this instruction to output an MPEG4 stream.

That is, in this imaging apparatus described as the third embodiment, it is possible not only to pick up images and record them as a high image quality MPEG2 stream but also to convert it to a low bit rate MPEG4 stream for output to the outside.

Although the imaging apparatus in FIG. 7 uses the transcoder shown in FIG. 1 as the first embodiment, it is also possible to configure the imaging apparatus by using the transcoder shown in FIG. 5 as the second embodiment. In addition, although the camera unit 10 has the image pickup block 11 therein, it is possible to modify the configuration in such a manner that a video signal receiver is connected in order to input video signals from the outside. It is also possible to modify the configuration so as to connect an MPEG2 stream receiver in order to input MPEG2 streams from the outside.

Although the first to third embodiments have been described on the assumption that the compressing/encoding format is transcoded from MPEG2 to MPEG4, the present invention is not limited to this transcoding scheme but can also be applied to between other compressing/encoding formats.

Further, a transcoder according to the present invention can be applied not only to such an imaging apparatus as mentioned above but also to such apparatus as a receiver (set-top box) which receives a video signal (stream) and transcodes it before outputting it to a display, an image output apparatus (display) which transcodes an input image signal before displaying it, an image recording apparatus which transcodes an input image signal before recoding it onto a recording medium (hard disk, optical disk or the like) and a home server which is connected to various image apparatus to supply image signals.

According to the present invention, it is possible to provide a transcoder and imaging apparatus improved in usability for the user.

The invention may be embodied in other specific forms without departing from the spirit or essential' characteristics thereof. The presented embodiments are therefore to be considered in all respects as illustrative and not restrictive. The scope of the invention being indicated by the appended claims rather than by the following description and range of equivalency of the claims are therefore intended to be embraced therein.

What is claimed is:

1. A signal processor to which a first image signal encoded by a first compressing and encoding method is inputted and in which the first image signal is transcoded to a second image signal encoded by a second compressing and encoding method, the signal processor comprising:
    a picture selector which extracts pictures of one or more specific types in frames or fields from the first image signal and generates a subset image signal of the first image signal;
    a video stream supplying section which supplies the first image signal to the picture selector;
    a first decoder which decodes the subset image signal generated by the picture selector; and
    a first encoder which encodes the decoded image signal by a second compressing and encoding method;
    wherein the picture selector uses the extracted pictures to generate the subset image signal whose effective length is reduced; and
    the video stream supplying section supplies, to smoothly have the extraction processing in the picture selector carried out, the first image signal to the picture selector at a bit rate that a decoding rate of the subset image signal by the first decoder is multiplied by a reciprocal number of a remove rate of the pictures.

2. The signal processor according to claim 1, wherein the picture selector performs picture extraction in such a manner that each extracted picture can refer to another extracted picture for motion compensation.

3. The signal processor according to claim 1, wherein:
    the first compressing and encoding method is an MPEG2 method and the second compressing and encoding method is an MPEG4 method; and
    the picture selector generates the subset image signal by extracting I-pictures and P-pictures.

4. The signal processor according to claim 1, wherein the picture selector allows the user to specify what types of pictures are to be extracted.

5. The signal processor according to claim 1, further comprising:
    a frame memory for storing the image signal decoded by the first decoder; and
    an output section which reads out the image signal from the frame memory and outputs the image signal to a display unit;
    wherein the output section outputs the image signal in transcoding to the display unit.

6. The imaging apparatus using the signal processor according to claim 1, said imaging apparatus comprising:
    an image pickup section which picks up an object;
    a second encoder which, by the first compressing and encoding method, encodes the first image signal supplied from the image pickup section; and
    a recording and reproducing section which records and reproduces the first image signal encoded by the second encoder to and from a recording medium,
    wherein the first image signal reproduced from the recording medium is supplied to the signal processor.

7. The imaging apparatus according to claim 6, further comprising:
    a receiver which receives an image signal from the outside;
    wherein the second encoder encodes the image signal supplied from the receiver by the first compressing and encoding method.

8. The imaging apparatus according to claim 6, further comprising:
    a receiver which receives the first image signal encoded by the first compressing and encoding method from the outside;
    wherein the recording and reproducing section records and reproduces the first image signal supplied from the receiver to and from the recording medium.

9. The imaging apparatus according to claim 6, wherein the recording and reproducing apparatus generates management information from the first image signal recorded on the recording medium and records the management information on the recording medium.

10. The signal processor according to claim 1, wherein the signal processor outputs the transcoded second image signal to an external equipment.

* * * * *